United States Patent [19]

Baba et al.

[11] Patent Number: 5,302,062
[45] Date of Patent: Apr. 12, 1994

[54] SPINDLE CLAMPING DEVICE FOR MACHINE TOOL

[75] Inventors: Sadamu Baba, Numazu; Toshio Kawakami, Zama, both of Japan

[73] Assignee: Toshiba Kikai Kabushiki Kaisha, Tokyo, Japan

[21] Appl. No.: 924,960

[22] Filed: Aug. 5, 1992

[30] Foreign Application Priority Data

Aug. 8, 1991 [JP] Japan ................... 3-223414
Sep. 3, 1991 [JP] Japan ................... 3-250394

[51] Int. Cl.⁵ .............................................. B23C 1/02
[52] U.S. Cl. ........................... 409/231; 279/4.09; 408/238; 409/241
[58] Field of Search ............ 409/231, 232, 233, 234, 409/238, 239, 241, 243; 279/4.09, 4.1, 49, 54; 408/238

[56] References Cited

U.S. PATENT DOCUMENTS

| | | |
|---|---|---|
| 2,957,393 | 10/1960 | Kampmeier ............ 409/241 X |
| 3,034,408 | 5/1962 | Kampmeier ............ 409/241 X |
| 3,103,144 | 9/1963 | Walter ................... 409/231 |
| 3,455,207 | 7/1969 | Meinke ................. 409/190 X |
| 3,545,335 | 12/1970 | Lehmkuhl ............. 409/231 |
| 4,032,162 | 6/1977 | Flinchbaugh ........ 279/4.09 |
| 5,137,400 | 8/1992 | Sagara et al. ........ 409/231 |

FOREIGN PATENT DOCUMENTS 62-43684 11/1967 Japan .
0272775 6/1970 U.S.S.R. ................. 279/4.09

Primary Examiner—Z. R. Bilinsky
Attorney, Agent, or Firm—Cushman, Darby & Cushman

[57] ABSTRACT

A machine tool is provided with a spindle clamping device for clamping a spindle assembly supported by a spindle head and composed of an outer spindle rotatably supported by the spindle head and an inner spindle disposed inside the outer spindle to be reciprocal along an axial direction thereof. The inner spindle is inserted into an inner hollow portion of the outer spindle so that a space is formed between an inner peripheral surface of the outer spindle and an outer peripheral surface of the inner spindle. The spindle clamping device comprises a pressure applying member such as a pair of pistons or oil ring disposed in the space between the outer and inner spindles for applying a pressure in an axial direction of the outer and inner spindles. The pressure applying member is provided with an oil chamber, and a pair of clamp rings are disposed in the space axially outside the pressure applying member. Each of the paired clamp rings comprises inner and outer ring elements having tapered surfaces slidably contacting each other. Spring members are disposed in the space axially outside the clamp rings, respectively, for urging the outer ring elements inwardly, and a static pressure pocket is formed in a contacting portion of the spindle head supporting the inner spindle wherein pressurized oil and air is supplied into the oil chamber through the static pressure pocket.

12 Claims, 3 Drawing Sheets

SPINDLE CLAMPING DEVICE FOR MACHINE TOOL

BACKGROUND OF THE INVENTION

The present invention relates to a spindle clamping device for a machine tool, particularly for clamping a spindle assembly of double-axis type structure, such as one found on a horizontal boring and milling machine.

In a horizontal boring and milling machine of a known structure, various kinds of spindle clamping devices are utilized, each having an outer milling spindle rotatably supported and an inner spindle also rotatably supported inside the milling spindle so as to reciprocate along the axial direction of the milling spindle. For instance, one example of such a horizontal boring and milling machine is provided with a first shaft as an outer milling spindle and a second shaft as an inner boring spindle. And in such example, the spindle clamping methods are classified into three manners, that is, (1) a method in which a .pressurized oil is always supplied to a static pressure pocket portion disposed between the milling spindle and the boring spindle for clamping the first shaft, (2) a method in which an oil ring is disposed between the first and second shafts and a pressurized oil is poured to the oil ring thereby clamping the first and second shafts, the oil ring being of a structure such as shown in the Japanese Utility Model Publication No. 62-43684, and (3) a method in which the first and second shafts are clamped by incorporating a self-pressurized oil retaining mechanism into the second shaft, such as disclosed in the Japanese Utility Model Publication (JITSUYO KOKOKU) No. 62-43684.

However, in the above prior art methods of (1) and (2), in which the pressurized oil is always supplied to the static pressure pocket portion disposed between the first shaft rotatably supported by a spindle head and the second shaft is disposed rotatably inside the first shaft to be reciprocal along the axial direction for clamping the first shaft, the pressurized oil must be always supplied or always retained during the rotations of the spindles. For this reason, a large quantity of heat is generated for the static pressure pocket portion during a cutting operation of the machine tool by rotating the first shaft with high speed. Accordingly, the first shaft is expanded in its axial direction by the thermal expansion of the static pressure pocket portion, which adversely affects the working precision of the machine tool.

Furthermore, in the above prior art method of (3), in which the pressurized oil is supplied to the oil ring disposed between the first shaft rotatably supported by the spindle head and the second shaft disposed rotatably inside the first shaft to be reciprocal along the axial direction for clamping the first and second shafts, not avoided to prevent the pressurized oil from leaking during the rotation of the shafts cannot be avoided, thus this method is not suitable for long term operation of the machine tool. In order to obviate these defects, in the prior art, a mechanism for supplying the oil to the oil ring must be provided by positioning the second shaft to a predetermined angular position and making coincident a phase of the oil pouring unit with a phase of an oil supplying unit. Therefore, when the pressurized oil leaks, the pressure to the oil ring is lowered, which makes it difficult to surely clamp the spindle with high rigidity. Furthermore, the oil supply to the oil ring requires much additional time, resulting in the lowering of the workability.

Other various attempts have been made in the prior art to provide an improved spindle clamping device for machine tools provided with a milling spindle and boring spindle particularly for the reason that insufficient rigidity of the boring spindle per se directly affects on cutting efficiency of the machine.

SUMMARY OF THE INVENTION

An object of the present invention is to substantially eliminate defects or drawbacks encountered in the prior art, described above, and to provide a spindle clamping device for a machine tool provided with rotatable outer and inner spindles capable of surely clamping the outer spindle and the inner spindle, which is disposed inside the outer spindle, and reciprocal therein in the axial direction.

This and other objects can be achieved according to the present invention by providing a machine tool spindle clamping device for clamping a spindle assembly supported by a spindle head and composed of a first spindle rotatably supported by the spindle head and a second spindle disposed inside the first spindle to be reciprocal along an axial direction thereof, the first spindle having an inner hollow structure and the second spindle being inserted into an inner hollow portion of the first spindle so that a space is formed between an inner peripheral surface of the first spindle and an outer peripheral surface of the second spindle, the spindle clamping device comprising:

a pressure applying means disposed in the space between the first and second spindles for applying a pressure in a longitudinal direction of the first and second spindles, the pressure applying means being provided with an oil chamber;

at least a pair of clamp rings disposed in the space longitudinally outside the pressure applying means, each of the paired clamp rings comprising a first ring element having one surface contacting the outer peripheral surface of the second spindle and another surface tapered downwardly outward of the pressure applying means and a second ring element having one surface contacting the inner peripheral surface of the first spindle and another surface slidably contacting the tapered surface of the first ring element;

elastic members disposed in the space longitudinally outside the clamp rings, respectively, for urging the second ring element inwardly; and a static pressure pocket formed on a contacting portion of the spindle head supporting the first spindle wherein a pressurized oil is supplied into the oil chamber through the static pressure pocket.

In preferred embodiments, the pressure applying means comprises a pair of piston members disposed in the space and the oil chamber is formed between the paired piston members disposed in the space. The first ring element of the clamp ring is stationally disposed with respect to the second spindle and the second ring element is disposed movably with respect to the first spindle.

The pressure applying means may comprise an oil ring disposed in the space and the oil chamber is formed in the oil ring and O-rings are disposed at both longitudinal ends of the oil ring.

In the present invention, the first spindle is a milling spindle and the second spindle is a boring spindle.

According to the structures of the spindle clamping device for a machine tool, described above, when the first and second spindles are clamped, the first ring elements of the paired clamp rings are secured by the urging force of the elastic members disposed outside the second ring elements so as to press the side ends of the second ring elements to move radially outward thereof. On the contrary, when the clamping between these spindles is released (unclamped) against the spring force of the elastic member, a pressurized oil is supplied into the oil chamber from a hydraulic source to slide longitudinally inward the second ring elements along the tapered surface of the first ring elements.

The nature and further characteristic features of the present invention will be made more clear hereunder by way of preferred embodiment with reference to the accompanying drawings.

DESCRIPTION OF THE PREFERRED EMBODIMENTS

Figure 1:
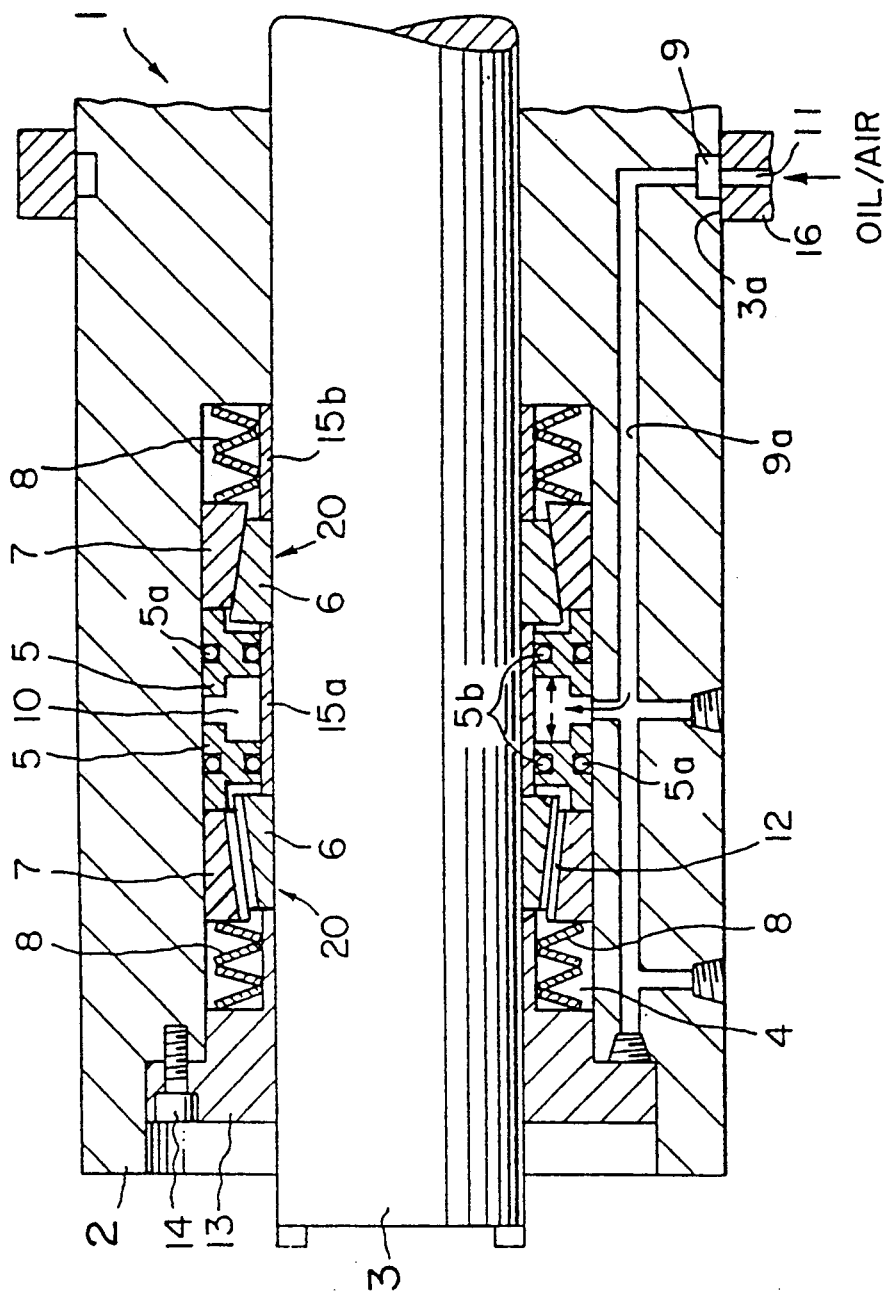
FIG. 1 is a longitudinal section of a spindle head of a horizontal boring and milling machine to which a spindle clamping device of a first embodiment of the present invention is applied.

FIG. 1 represents a first embodiment of the present invention and FIG. 1 is a longitudinal section of a spindle head 1 to which a spindle clamping device is applied. The spindle head 1 is for a horizontal boring and milling machine provided with a hollow milling spindle 2 rotatably supported to the spindle head 1 and a boring spindle 3 is rotatably supported in the milling spindle 2 in such manner that the boring spindle 3 can be moved back and forth along the axial direction thereof by a drive mechanism (not shown).

The milling spindle 2 has an inner cylindrical hollow portion as an inner space 4, in which means for applying longitudinal, as viewed in FIG. 1, pressure is disposed. In this embodiment shown in FIG. 1, this means is composed of a pair of pistons 5, 5 disposed in the inner space 4. A pair of clamp rings 20 are also disposed in the space 4 longitudinally outside the pistons 5, 5, respectively, and each of the clamp rings 20 comprises an inner ring element 6 having a tapered outer surface inclining downwardly outward aparting from the respective pistons 5, 5 in its axial direction and an outer ring element 7 having a tapered inner surface slidably corresponding to the tapered outer surface of the inner ring element 6. That is, the outer ring element 7 has a surface contacting the inner peripheral surface of the milling spindle 2 and a surface contacting the tapered outer surface of the inner ring element 6 which also has a surface contacting the outer peripheral surface of the boring spindle 3. A pair of elastic members, disk springs in this embodiment, 8, 8 are also disposed in the inner space 4 further axially outside the clamp rings 20 so as to urge the respective clamp rings 20 inwardly. O-rings 5a, 5b are also provided with the respective pistons 5, 5.

An oil chamber 10 is further formed between the paired pistons 5, 5 disposed in the space 4. A hydraulic device (not shown) is also disposed to a contact portion 3a of the spindle head 1 supporting the milling spindle 2. The hydraulic device is adapted to supply the pressurized oil into the oil chamber 10 through a static pressure pocket portion (groove) 9 which is formed by fitting a sliding ring 16 to the rear portion of the milling spindle 2, and through a passage 9a formed in the spindle head 1.

As mentioned hereinbefore, the boring spindle 3 is disposed inside the milling spindle 2 so as to penetrate the same, so that the ring shaped inner space 4 is formed between the inner peripheral surface of the milling spindle 2 and the outer peripheral surface of the boring spindle 3. Spacers 15, 15 are disposed on contact portions of the pistons 5 and one of the disk springs 8 to the outer peripheral surface of the boring spindle 3 reducing frictional resistance to the pistons 5 and the disk springs 8, which will be caused by the reciprocal movement of the boring spindle 3.

A lid or cap member 13 is fitted to an open end side, left side as viewed, of the milling spindle 2 and the lid member 13 has a front end inserted into the inner space 4 and abutting against the outside surface of the inner ring member 6. The lid member 13 is fixed by means of a bolt 14 so that the abutting end constitutes a positioning reference of the spacers 15.

A hole or passage 11 is formed through the slide ring 16 through which a pressurized oil or a compressed air is supplied from a pressurized oil supply unit or a compressed air supply unit to the static pressure pocket portion 9.

Furthermore, it is preferred to form grooves 12 for oil removal to the surfaces of the ring elements 6 and 7 of the clamp rings 20 contacting the milling spindle 2 and the boring spindle 3 for further ensuring the clamping function.

The spindle clamping device according to this embodiment will operate as follows.

When the milling and boring spindles 2 and 3 are clamped, the outer ring elements 7 of the clamp rings 20 are urged inwardly respectively by the spring force of the disk springs 8, and hence, the outer ring elements 7 move in a direction, normal to the longitudinal, i.e. axial, direction, to expand the clamp rings 20 by the sliding motion of the outer ring elements 7 along the tapered surfaces of the inner ring elements 6, thus achieving the clamping function between the milling spindle 2 and the boring spindle 3.

On the contrary, when the clamping between the milling spindle 2 and the boring spindle 3 is released (unclamped), pressurized oil is supplied from the hydraulic device into the oil chamber 10 through the static pressure pocket portion 9 and the passage 9a, whereby the outer ring elements 7 slid on the tapered outer surfaces of the corresponding inner ring elements 6 by the longitudinal, i.e. axial, force of the pressurized oil supplied in the pressure chamber 10 in a direction axially reverse to that in the case of the achieving the clamping, thus releasing the clamping force between the milling spindle 2 and the boring spindle 3.

Furthermore, at a time of the operation stop of the spindles, compressed air is supplied to the static pressure pocket portion 9 of the milling spindle 1, by switching to a compressed air supply unit, through the air passage 11 of the sliding ring 16 to drain the oil in the pocket portion 9, so that the oil is not sheared by the milling spindle 2 thus preventing heat generation thereof.

Moreover, due to the fact that the oil cutting groove 12 is formed circumferentially to the surfaces contracting the milling spindle 2 and the boring spindle 3, the formation of an oil film on the milling spindle 2 can be prevented and the clamping operation can thus be surely performed.

Figure 2:
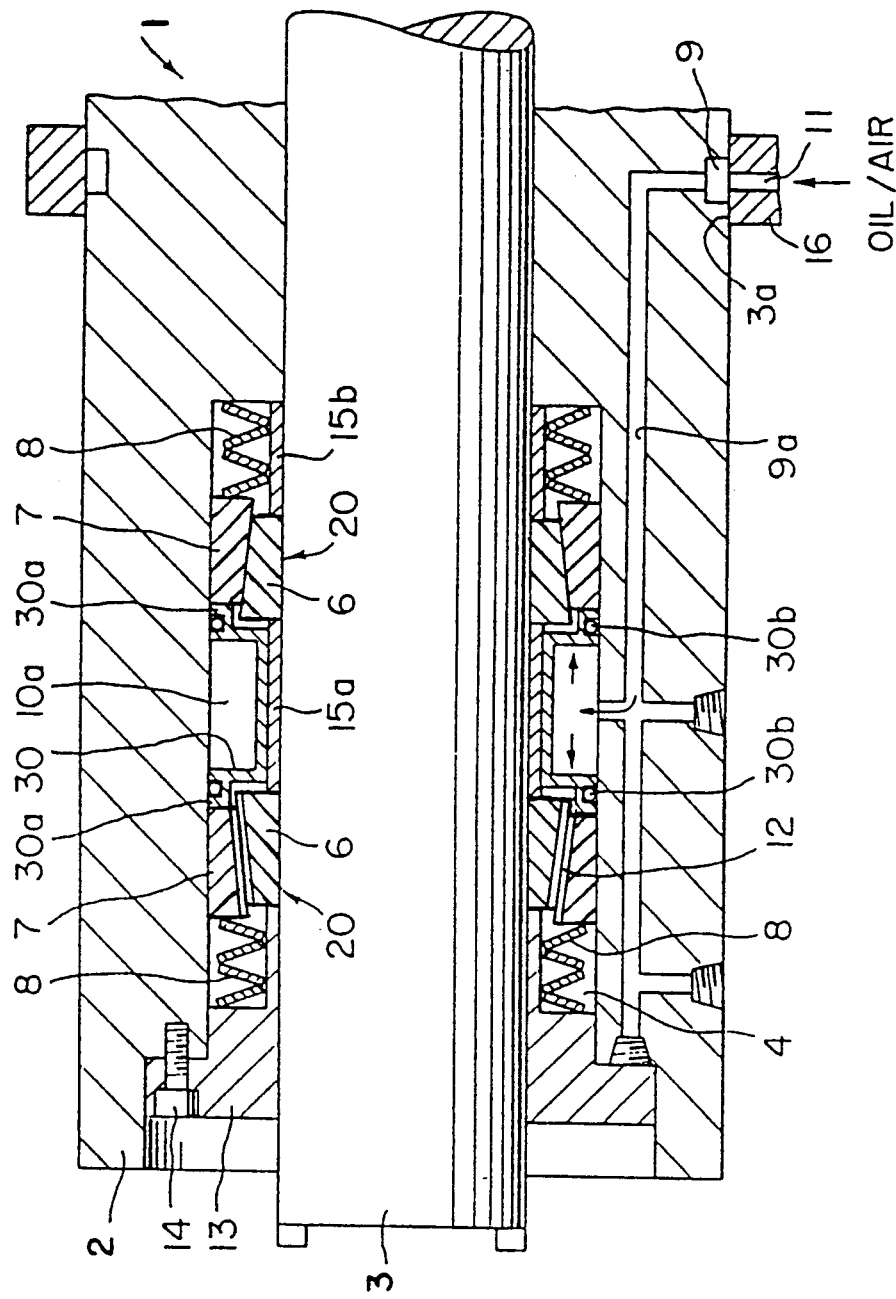
FIG. 2 is also a longitudinal section of a spindle head of a horizontal boring and milling machine to which a spindle device mechanism of a second embodiment of the present invention is applied.

FIG. 2 is a longitudinal section of a spindle head 1 to which a spindle clamping device according to the second embodiment of the present invention is applied. The structure of the second embodiment is substantially the same as that of the first embodiment except that an oil ring 30 is disposed in the place of the pair of pistons 5, 5 in the first embodiment, and accordingly, like reference numerals are added to elements and members corresponding to those of FIG. 1 and repeated explanation is omitted hereunder.

Referring to FIG. 2, the milling spindle 2 has an inner cylindrical hollow portion as an inner space 4, in which means for applying longitudinal, as viewed in FIG. 2, pressure is disposed, and in this embodiment shown in FIG. 2, this means is composed of an oil ring 30 having a U-shaped section and provided with O-rings 30b at its axial both ends as shown. An oil chamber 10a is formed in the oil ring 30. A pair of clamp rings 20 are also disposed in the space 4 longitudinally, i.e. axial, outside the O-ring 30b and each of clamp rings 20 comprises an inner ring element 6 having a tapered surface inclining downwardly outward and an outer ring element 7 having a tapered surface slidably corresponding to the tapered surface of the inner ring element 6. A pair of elastic members, disk springs, 8, 8 are also disposed in the inner space 4 further axially outside the clamp rings so as to urge the respective clamp rings inwardly.

Spacers 15 are also disposed between the disk springs 8, 8 and the oil ring 30 and the outer peripheral surface of the boring spindle 3.

A hydraulic device is also disposed to a contact portion of the spindle head 1 supporting the milling spindle 2, the hydraulic device being adapted to supply the pressurized oil into the oil chamber 10a through a static pressure pocket portion 9.

The spindle clamping device according to the second embodiment will operate as follows.

As stated with reference to the first embodiment of FIG. 1, when the milling and boring spindles 2 and 3 are clamped, the outer ring elements 7 of the clamp rings 20 are urged inwardly by the spring force of the disk springs 8, and hence, the outer ring elements 7 move in a direction, normal to the longitudinal, i.e. axial direction, to expand the clamp rings 20 by the sliding motion of the outer ring elements 7 along the tapered surfaces of the inner ring elements 6, thus achieving the clamping function between the milling spindle 2 and the boring spindle 3.

On the contrary, when the clamping between the milling spindle 2 and the boring spindle 3 is released, the pressurized oil is supplied from the hydraulic device into the oil chamber 10a through the static pressure pocket portion 9 and the passage 9a at this moment, hydraulic pressure is applied to the oil chamber 10a and, hence, an edge portion 30a of the oil ring 30 acts to the outer ring element 7 of the clamp ring 20, thus sliding the outer ring element 7 on the tapered surface of the corresponding inner ring element 6 in a direction axially reverse to that in the case of achieving the clamping, thus releasing the clamping force between the milling spindle 2 and the boring spindle 3. At a time of the operation stop of the spindles, a compressed air is supplied to the static pressure pocket portion 9.

It is to be noted that substantially the same functions and effects as those of the first embodiment can be achieved by the second embodiment of FIG. 2.

Figure 3:
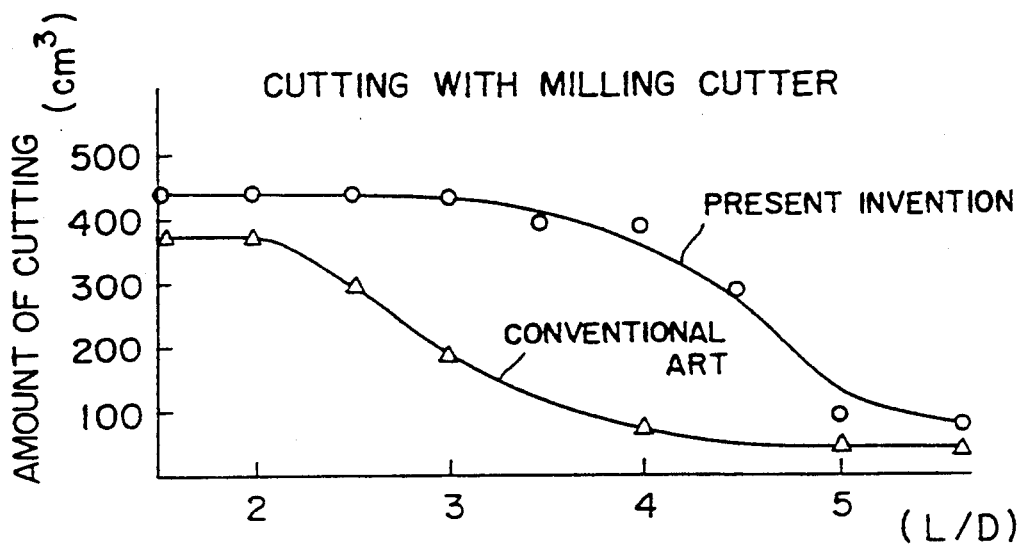
FIG. 3 is a graph showing the cutting amount of a machine tool with a milling cutter and a spindle clamping device provided in accordance with the present invention, in comparison with the cutting amount of the machine tool with the milling cutter and a conventional spindle clamping device.
Figure 4:
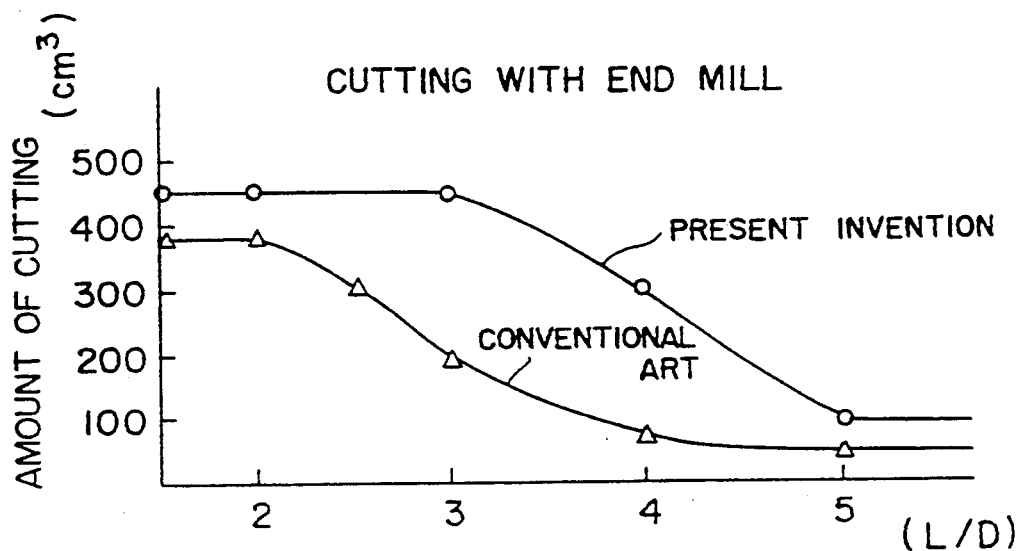
FIG. 4 is a graph showing the cutting amount of a machine tool with an end mill and the spindle clamping device provided in accordance with the present invention, in comparison with the cutting amount of the machine tool with the end mill and a conventional spindle clamping device.

FIG. 3 shows the cutting amount of a machine tool with a milling cutter and a spindle clamping device provided in accordance with the present invention, in comparison with the cutting amount of the machine tool with the milling cutter and a conventional spindle clamping device. FIG. 4 shows the cutting amount of the machine tool with an end mill and the spindle clamping device provided in accordance with the present invention, in comparison with the cutting amount of the machine tool with the end mill and the conventional spindle clamping device. The axis of abscissas in each of FIGS. 3 and 4 indicates the amount ($cm^3$) of cutting by the machine tool. The axis of ordinates in each of FIGS. 3 and 4 indicate the ratio L/D of the length L of the boring spindle of the machine tool from the tip of the milling spindle thereof, to the diameter D of the boring spindle. It is understood from FIGS. 3 and 4 that the cutting amount of the machine tool with the milling cutter and the spindle clamping device provided in accordance with the present invention is about twice that of the machine tool with the milling cutter and the conventional spindle clamping device, and the cutting amount of the machine tool with the end mill and the former device is about four times as much as that of the machine tool with the end mill and the latter device. Therefore, good results are obtained through the use of the former device in both the cases (See U.S. Pat. No. 5,137,400).

The present invention is not limited to the embodiments described above, but may be embodied or practiced in other various ways without departing from the spirit or essential character of the invention.

What is claimed is:

1. A spindle clamping device for a machine tool for clamping a spindle assembly supported by a spindle head and composed of a first spindle rotatably supported by the spindle head and a second spindle rotatably supported inside the first spindle to be reciprocal along an axial direction thereof, said first spindle having an inner hollow portion and said second spindle being inserted into said inner hollow portion of the first spindle so that a space is formed between an inner peripheral surface of the first spindle and an outer peripheral surface of the second spindle, said spindle clamping device comprising:

pressure applying means disposed in the space between the first and second spindles for applying a pressure in an axial direction of the first and second spindles, said pressure applying means being provided with an oil chamber;

at least a pair of clamp rings disposed in the space axially outside the pressure applying means, each of said paired clamp rings comprising a first ring element having one surface contacting the outer peripheral surface of the second spindle and another surface tapered downwardly outward of the pressure applying means and a second ring element having one surface contacting the inner peripheral surface of the first spindle and another surface slidably contacting the tapered surface of the first ring element;

elastic means disposed in the space axially outside the clamp rings, respectively, for urging the second ring element inwardly; and a static pressure pocket formed to a contacting portion of the spindle head supporting the first spindle wherein a pressurized oil or an air is supplied into the oil chamber through the static pressure pocket.

2. The spindle clamping device according to claim 1, wherein said pressure applying means comprises a pair of piston members disposed in the space between the first and second spindles and said oil chamber is formed between the paired piston members.

3. The spindle clamping device according to claim 2, wherein spacer means are further disposed between the elastic means and the outer peripheral surface of the second spindle, and the paired piston member and the outer peripheral surface of the second spindle.

4. The spindle clamping device according to claim 2, wherein said first ring element of the clamp ring is axially fixed with respect to the second spindle and said second ring element is disposed movably with respect to the first spindle.

5. The spindle clamping device according to claim 1, wherein said elastic means comprises a disk spring each having one end contacting the second ring element of the clamp ring.

6. The spindle clamping device according to claim 1, wherein said first spindle is a milling spindle and said second spindle is a boring spindle.

7. The spindle clamping device according to claim 1, wherein said pressure applying means comprises an oil ring disposed in the space between the first and second spindles and said oil chamber is formed in the oil ring.

8. The spindle clamping device according to claim 7, wherein spacer means are further disposed between the elastic means and the outer peripheral surface of the second spindle, and the oil ring and the outer peripheral surface of the second spindle.

9. The spindle clamping device according to claim 7, wherein, said first ring element of the clamp ring is axially with respect to the second spindle and said second ring element is disposed movably with respect to the first spindle.

10. The spindle clamping device according to claim 7, wherein said elastic means comprises disk springs each having one end contacting the second ring element of the clamp ring.

11. The spindle clamping device according to claim 7, wherein said first spindle is a milling spindle and said second spindle is a boring spindle.

12. The spindle clamping device according to claim 1, wherein groove means is formed to surfaces of the first and second ring elements contacting each other.

* * * * *